US006519939B1

(12) United States Patent
Duff

(10) Patent No.: US 6,519,939 B1
(45) Date of Patent: Feb. 18, 2003

(54) HYDRAULIC SYSTEM, MANIFOLD AND VOLUMETRIC COMPENSATOR

(75) Inventor: Michael Alexander Duff, North Vancouver (CA)

(73) Assignee: M-Mac Actuators, Inc., Vancouver (CA)

(*) Notice: Subject to any disclaimer, the term of this patent is extended or adjusted under 35 U.S.C. 154(b) by 0 days.

(21) Appl. No.: 09/619,083

(22) Filed: Jul. 17, 2000

(51) Int. Cl.[7] .................................... F16D 31/02
(52) U.S. Cl. .................................... 60/473; 60/475
(58) Field of Search .................... 60/475, 473, 415, 60/476, 464, 478, 98 W, 468, 329, 422; 138/30, 31

(56) References Cited

U.S. PATENT DOCUMENTS

| | | | | | |
|---|---|---|---|---|---|
| 2,640,323 | A | | 6/1953 | McLeod | 60/475 |
| 2,640,426 | A | * | 6/1953 | McLeod | 60/475 |
| 2,939,283 | A | * | 6/1960 | Ashton | 60/432 |
| 3,401,605 | A | * | 9/1968 | Born | 60/329 |
| 3,933,167 | A | | 1/1976 | Byers | |
| 4,425,759 | A | * | 1/1984 | Krusche | 60/420 |
| 4,431,064 | A | * | 2/1984 | Bright | 60/464 |
| 4,777,983 | A | * | 10/1988 | Stevely | 138/30 |
| 5,144,801 | A | | 9/1992 | Scanderbeg et al. | 60/475 |
| 5,181,380 | A | * | 1/1993 | Favre et al. | 60/478 |
| 5,285,643 | A | * | 2/1994 | Hirata et al. | 60/468 |
| 5,575,150 | A | * | 11/1996 | Vieten et al. | 60/476 |

* cited by examiner

*Primary Examiner*—Edward K. Look
*Assistant Examiner*—Igor Kershteyn
(74) *Attorney, Agent, or Firm*—Kolisch Hartwell, P.C.

(57) ABSTRACT

A hydraulic system manifold having a body, a counterbalancer in the body and a flow controller in the body is disclosed. The body has first and second pump ports, first and second cylinder ports, first and second compensator ports and first and second supply conduits in communication with the first and second pump ports, the counterbalancer and the flow controller. The counterbalancer is in communication with the first and second supply conduits and the cylinder ports, to communicate hydraulic fluid between the first and second supply conduits and the first and second cylinder ports while counterbalancing hydraulic fluid pressure in the first and second supply conduits. The flow controller is in communication with the first and second supply conduits and the compensator ports, to control the flow of hydraulic fluid between the compensator ports and the first and second supply conduits to supply and store hydraulic fluid in a volumetric compensator in communication with the compensator ports.

17 Claims, 3 Drawing Sheets

HYDRAULIC SYSTEM, MANIFOLD AND VOLUMETRIC COMPENSATOR

BACKGROUND OF THE INVENTION

1. Field of Invention

This invention relates to hydraulic systems and more particularly to a hydraulic system manifold and a volumetric compensator.

2. Description of Related Art

Hydraulic linear actuators are well known and widely used in industry. In contrast to electromechanical actuators, they are more practical and reliable in applications requiring a large, controllable force. A double-acting hydraulic linear actuator applies such force both in extension and in retraction.

Conventionally, a hydraulic linear actuator is connected to a remote supply of pressurized hydraulic fluid through a closed network of pipes and control valves. However, those are applications where it is desirable for a hydraulic linear actuator to be freestanding and mobile, having a prime mover, a pump, and a closed hydraulic fluid control system all integrated with and located proximate to the linear actuator. Such freestanding actuators are particularly suitable for vehicular applications, such as on automobiles and aircraft.

Prior art freestanding hydraulic actuators are disclosed in U.S. Pat. No. 2,640,323 and 2,640,426 to Stewart B. McLeod and U. S. Pat. No. 5,144,801 to Dino Scanderbeg et al.

It appears that the devices disclosed in each of these references use a reservoir to supply a pump with hydraulic fluid and, where unbalanced cylinders (single rod cylinders) are used, the reservoir absorbs excess hydraulic fluid ejected from the cylinder during rod retraction. Disadvantageously, fluid in a reservoir flows in response to gravitational force, and thus the orientation of the reservoir and the actuator at large may be constrained. If a reservoir-type actuator is improperly oriented, the pump may not be properly supplied with fluid and cavitation may result. Furthermore, generally, a reservoir-type actuator requires more hydraulic fluid to reduce the risk of cavitation.

Conventional freestanding hydraulic linear actuators do not provide for load locking, except through operation of the prime mover. Locking the actuator in position to support a load requires that sufficient fluid pressure be maintained in the actuator cylinder to support the rod. Convention al freestanding hydraulic linear actuators do not normally have the necessary valve configuration to accomplish this task, and thus depend on the prime mover to maintain fluid pressure for load locking.

Thus, there is a need for a way to provide a reservoir-less, freestanding, hydraulic linear actuator that can be operated in any orientation, independent of gravitational forces and which provides for load locking without the operation of a prime mover.

SUMMARY OF THE INVENTION

The above problems in the prior art are addressed by providing a hydraulic system manifold comprising a body, a counterbalancer in the body and a flow controller in the body. The body has first and second pump ports, first and second cylinder ports, first and second compensator ports and first and second supply conduits in communication with the first and second pump ports, the counterbalancer and the flow controller. The counterbalancer is in communication wit h the first and second supply conduits and th e cylinder ports, to communicate hydraulic fluid between the first and second supply conduit s and the first and second cylinder ports while counterbalancing hydraulic fluid pressure in th e first and second supply conduits. The flow controller is in communication with the first and second supply conduits and the compensator ports, to control the flow of hydraulic fluid between the compensator ports and the first and second supply conduits to supply and store hydraulic fluid in a volumetric compensator in communication with the compensator ports.

The counterbalancer may comprise first and second cross piloted counterbalance valves. The first cross piloted counterbalance valve may be connected between the first supply conduit and the first cylinder port and the second cross piloted counterbalance valve may be connected between the second supply conduit and the second cylinder port such that a fraction of hydraulic pressure in the first supply conduit is operable to actuate the second cross piloted counterbalance valve to permit fluid to flow from the second cylinder port to the second supply conduit and such that a fraction of hydraulic pressure in the second supply conduit actuates the first cross piloted counterbalance valve to permit fluid to flow from the first cylinder port to the first supply conduit.

Preferably, the first and second cross piloted counterbalance valves are independently thermally actuated to permit hydraulic fluid flow from the first and second cylinder ports to the first and second supply conduits respectively, when the temperature of hydraulic fluid at a corresponding one of the cylinder ports exceeds a value.

The flow controller may include first and second cross piloted check valves. The first cross piloted check valve may be in communication with the first supply conduit and the first compensator port and the second cross piloted check valve may be in communication with the second supply conduit and the second compensator port. The first cross piloted check valve may be actuated by a fraction of hydraulic pressure in the second supply conduit to permit fluid to flow from the first supply conduit to the first compensator port and the second cross piloted check valve may be actuated by a fraction of hydraulic pressure in the first supply conduit to permit fluid to flow from the second supply conduit to the second compensator port.

Preferably, first and second pressure relief valves are connected in opposite directions between the first and second supply conduits respectively.

The body may have a pump mount for removably mounting a hydraulic fluid circulating pump to the body for communication with the first and second pump ports. The body may also have a cylinder mount for removably mounting a hydraulic cylinder in communication with the first and second cylinder ports. The body may also have a volumetric compensator mount for removably mounting the volumetric compensator in communication with the first and second compensator ports.

A hydraulic system may be formed by a hydraulic cylinder mounted to the body in communication with the first and second cylinder ports, a hydraulic circulating pump mounted to the body in communication with the first and second pump ports, and a volumetric compensator mounted to the body in communication with the first and second volumetric compensator ports.

The volumetric compensator may have a housing having an opening for communicating with the first and second compensator ports to receive and expel hydraulic fluid, a flexible diaphragm member defining an expandable volume within the housing and in communication with the openings to receive hydraulic fluid therein, and a counterforce provider, for providing a counterforce on the flexible diaphragm member, tending to reduce the expandable volume.

The counterforce provider may comprise a spring acting between the housing and the flexible diaphragm member.

Preferably the volumetric compensator has a mount for removably mounting the housing to the hydraulic system manifold such that the opening is in communication with first and second compensator ports of the manifold.

Other aspects and features of the present invention will become apparent to those ordinary skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
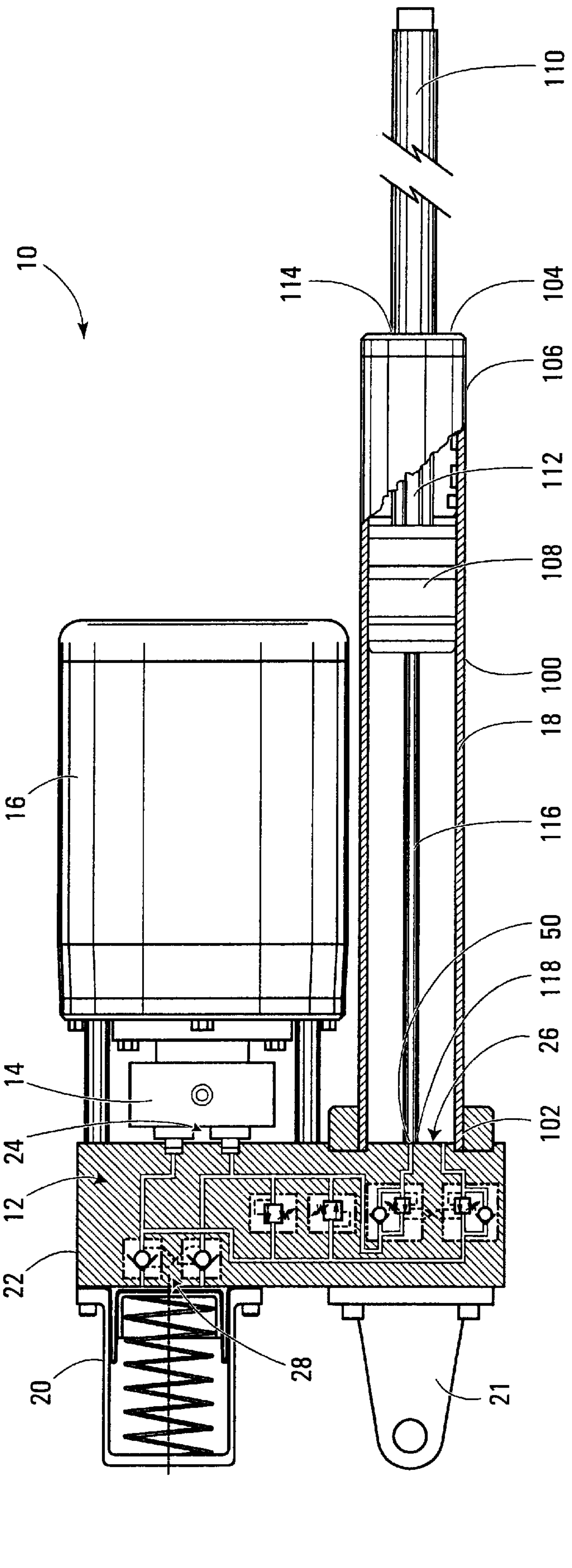
FIG. 1 is a cross-sectional view of a system according to a first embodiment of the invention.

Referring to FIG. 1, a hydraulic system according to a first embodiment of the invention is shown generally at 10. In this embodiment, the hydraulic system is a linear actuator system. The system includes a manifold 12 to which is removably mounted a hydraulic pump 14, and a prime mover 16, which in this embodiment is an electric motor. Also mounted to the manifold 12 is a hydraulic cylinder 18, a volumetric compensator 20 and a mounting lug 21. Effectively, the manifold 12 serves to conduct and control the flow of hydraulic fluid between the pump 14, the compensator 20, and the hydraulic cylinder 18.

Figure 2:
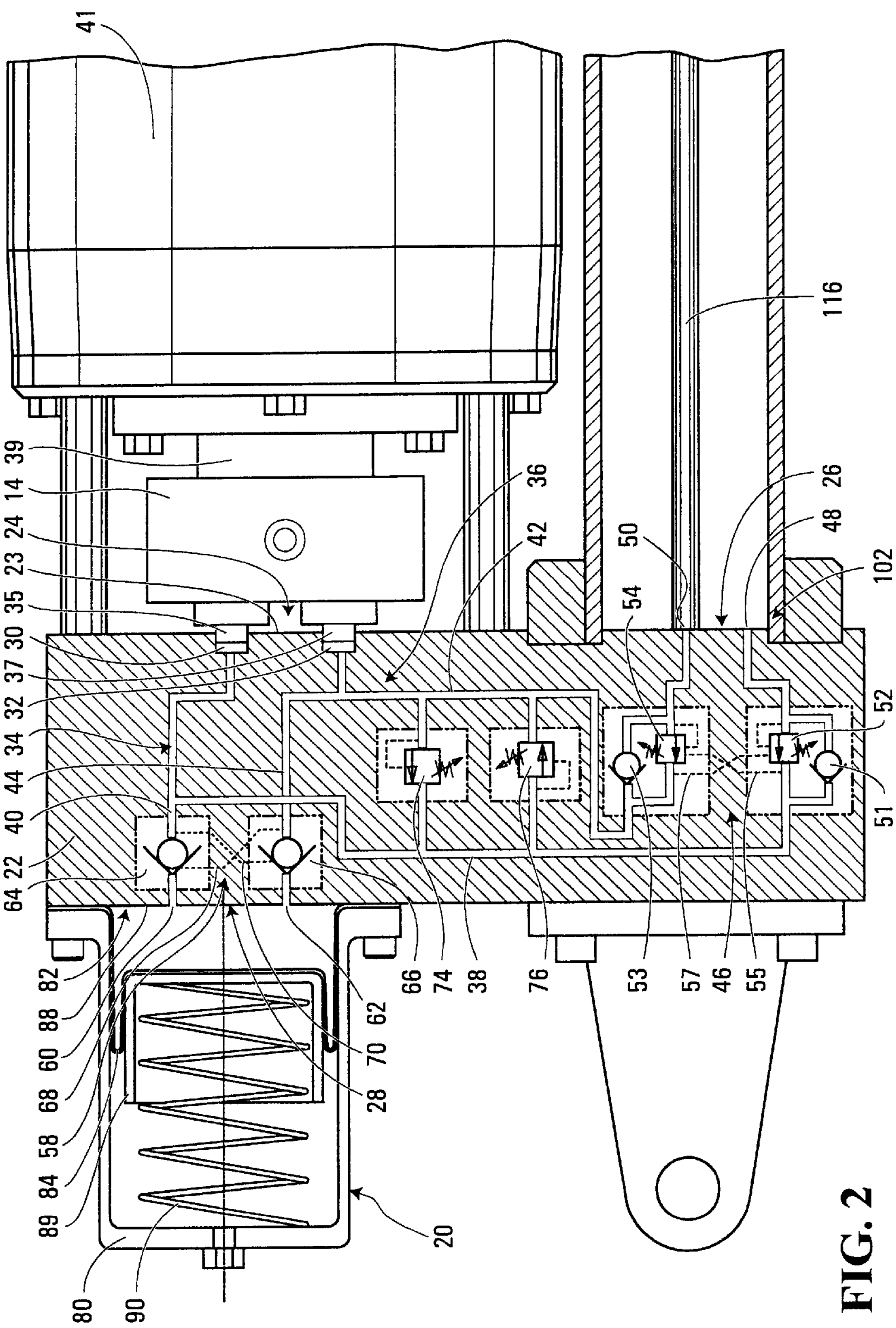
FIG. 2 is a detailed cross-sectional view of a manifold according to the first embodiment of the invention.

Referring to FIG. 2, the manifold 12 is comprised of a body 22 having a pump interface shown generally at 24, a cylinder interface shown generally at 26 and a compensator interface shown generally at 28. The pump interface 24 has a pump mounting surface 23 having first and second pump ports 30 and 32 in communication with first and second supply conduits 34 and 36 respectively, formed in the body 22. The pump mounting surface 23 facilitates mounting of the pump 14 onto the body 22 such that corresponding ports 35 and 37 of the pump 14 are in communication with the first and second pump ports 30 and 32 respectively such that hydraulic fluid is communicated between the pump ports 30 and 32 and the supply conduits 34 and 36 respectively.

Referring back to FIG. 1, in this embodiment the hydraulic pump 14 is a bi-directional rotary pump. Those skilled in the art will recognize that other types of pump could also be used to implement aspects of the invention, such pumps including gear pumps, axial piston pumps, radial piston pumps, gerotor pumps, and geroler pumps.

The pump 14 may have a mechanical coupling 39 for receiving torque from a prime mover 41, which in this embodiment is an electric motor. Other types of prime mover could also be used, including internal combustion engines, for example.

When the prime mover 41 applies torque in a first direction, the pump 14 draws hydraulic fluid from the first pump port 30 and forces hydraulic fluid into the second pump port 32. When the prime mover 41 applies torque in a second direction opposite to the first direction, the pump 14 draws hydraulic fluid from the second pump port 32 and forces the hydraulic fluid into the first pump port 30.

Counterbalancer

The first supply conduit 34 has a first portion 38 and a second portion 40, while the second supply conduit has a first portion 42 and a second portion 44.

Preferably first and second pressure relief valves 74 and 76 are connected in opposite directions between the first and second supply conduits 34 and 36, respectively, to prevent excess hydraulic fluid pressure from building and exceeding a value.

The first portions 38 and 42 of the first and second supply conduits 34 and 36 respectively are in communication with a counterbalancer shown generally at 46. The counterbalancer 46 is further in communication with first and second cylinder ports 48 and 50 of the cylinder interface 26, and communicate hydraulic fluid to the hydraulic cylinder 18. The counterbalancer 46 communicates hydraulic fluid between the first and second supply conduits 34 and 36 and the first and second cylinder ports 48 and 50 respectively, and isolates hydraulic fluid pressure in the first and second supply conduits 34 and 36 from hydraulic fluid pressure in the cylinder 18.

Normal flow of hydraulic fluid from the first portions 38 and 42 of the first and second supply conduits 34 and 36 to the first and second cylinder ports 48 and 50 respectively is provided through first and second cartridge style check valves 51 and 53. Pressure isolation between the first and second supply conduits 34 and 36 and the first and second cylinder ports 48 and 50 is achieved through the use of first and second cross piloted counterbalance valves 52 and 54 respectively, which are in communication with the first and second check valves 51 and 53 respectively, such that they permit fluid to flow in directions opposite to that of the first and second check valves respectively. The first cross piloted counterbalance valve 52 is connected between the first portion 38 of the first supply conduit 34 and the first cylinder port 48. The second cross piloted counterbalance valve 54 is connected between the first portion 42 of the second supply conduit 36 and the second cylinder port 50. First and second pilot conduits 55 and 57 are formed in the manifold 12 such that a fraction of hydraulic pressure in the first portion 38 of the first supply conduit 34 is operable to actuate the second cross piloted counterbalance valve 54 to permit fluid to flow from the second 5 cylinder port 50 to the second supply conduit 36 and such that a fraction of hydraulic pressure in the first portion 42 of the second supply conduit 36 is operable to actuate the first cross piloted counterbalance valve 52 to permit fluid to flow from the first cylinder port 48 to the first supply conduit 34. It has been found that a 3:1 cross piloting ratio provides suitable results.

Preferably the first and second cross piloted counterbalance valves 52 and 54 are independently thermally actuated to permit hydraulic fluid flow from the first and second cylinder ports 48 and 50 to the first and second supply conduits 34 and 36 respectively, when the temperature of hydraulic fluid at a corresponding one of the cylinder ports 48 and 50 exceeds a value.

Referring back to FIG. 1, the hydraulic cylinder 18 has a cylinder barrel 100 having a blind end 102 and a rod end 104. The blind end 102 is sealingly mounted to the body 22 and is in communication with the first cylinder port 48. In contrast, the rod end 104 is terminated in an annular cylinder head 106.

The cylinder barrel 100 houses an annular piston 108 that supports a tubular piston rod 110 having an internal bore 112. The cylinder barrel 100, cylinder head 106, piston 108 and piston rod 110 are coaxial. The annular cylinder head 106 defines an opening 114 sized to sealingly accept the piston rod 110 for reciprocating motion therethrough. In this embodiment the cylinder 18 is unbalanced, however, aspects of the invention would also apply to balanced cylinder embodiments.

Figure 3:
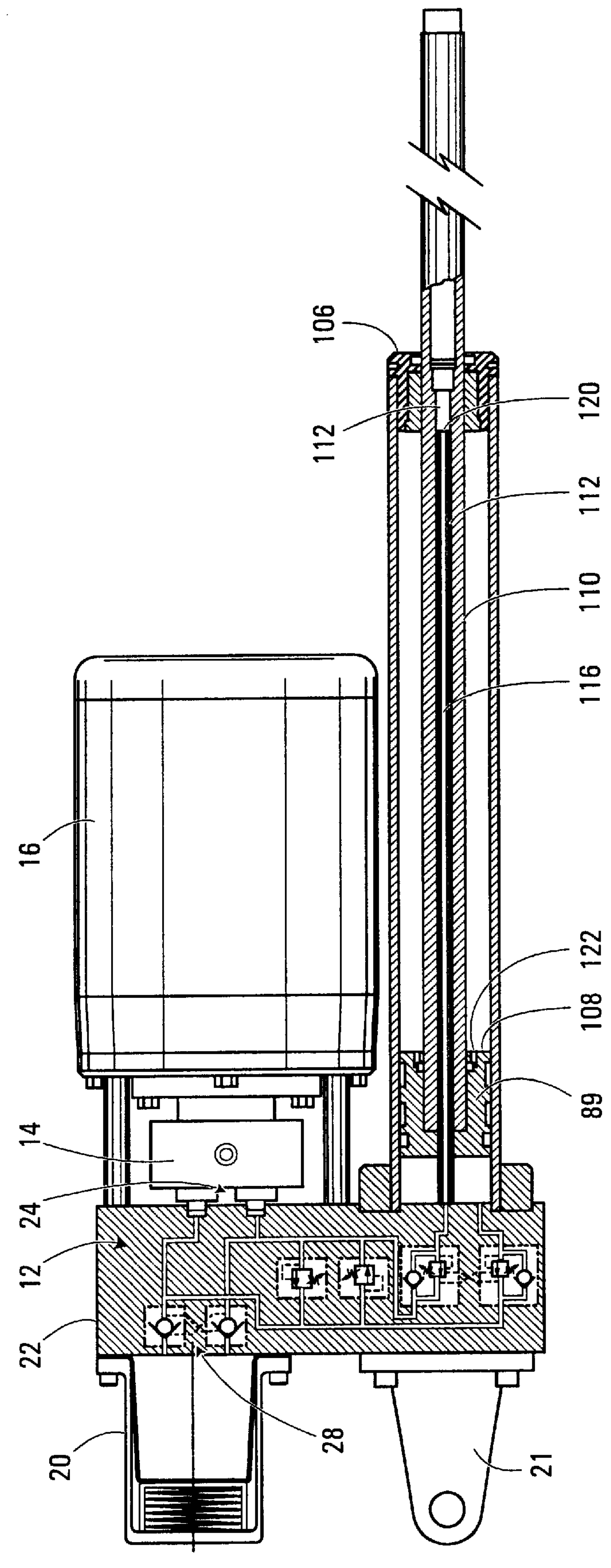
FIG. 3 is a detailed cross-sectional view of a cylinder shown in FIG. 1.

The cylinder 18 further includes an elongated transfer tube 116, concentric with the piston rod 110 and sized to fit sealingly within its internal bore 112 such that the piston rod 110 may reciprocate axially along the transfer tube 116. The transfer tube 116 has a blind end 118 proximate the body 22 and in communication with the second cylinder port 50 and has an open rod end 120 proximate the cylinder head 106, for communicating with the internal bore 112 of the piston rod 110, seen best in FIG. 3.

Ducts 122 perforate the piston 108 and the piston rod 110. The ducts 122 provide a fluid path between the piston 108 the bore 112 in the piston rod 110 to an interior volume enclosed between the piston 108 and the cylinder head 106.

Flow Controller

The second portions 40 and 44 of the first and second supply conduits 34 and 36 respectively are in communication with a flow controller shown generally at 58. The flow controller 58 is further in communication with first and second compensator ports 60 and 62 respectively. The flow controller 58 controls the flow of hydraulic fluid between the first and second compensator ports 60 and 62 and the second portions 40 and 44 of the first and second supply conduits 34 and 36 to supply and store hydraulic fluid in the volumetric compensator 20 which is in communication with the compensator ports 60 and 62.

In this embodiment, the flow controller 58 includes first and second cartridge style cross piloted check valves 64 and 66. Third and fourth pilot conduits 68 and 70 are formed in the manifold 12 such that the first cross piloted check valve 64 is actuated by a fraction of hydraulic pressure in the second supply conduit 36 to permit fluid to flow from the first supply conduit 34 to the first compensator port 60 and such that the second cross piloted check valve 66 is actuated by a fraction of hydraulic pressure in the first supply conduit 34 to permit fluid to flow from the second supply conduit 36 to the second compensator port 62. Again, a 3:1 cross piloting ratio has been found to provide suitable results.

In this embodiment, the volumetric compensator 20 has a housing 80 having a large opening shown generally at 82 for communicating with the first and second compensator ports to receive and expel hydraulic fluid therefrom. A flexible diaphragm member 84 is secured between the housing 80 and the manifold and is dimensioned to define an expandable volume 86 within the housing 80, between the flexible diaphragm member 84 and a mounting surface 88 of the compensator interface 28. The flexible diaphragm member 84 is sealingly seated to the housing 80 and circumscribes the first and second compensator ports 60 and 62. This expandable volume 86 is in communication with the first and second compensator ports 60 and 62 to receive hydraulic fluid therein.

The volumetric compensator 20 further includes a piston 89 positioned inside the housing 80 adjacent the flexible diaphragm member 84, and a counterforce provider 90, which in this embodiment is a spring acting between the housing 80 and the piston 89, for providing a counterforce on the flexible diaphragm member 84, tending to urge the piston 89 toward the flexible diaphragm member 84, to reduce the expandable volume, and expel hydraulic fluid into either of the first and second compensator ports 60 and 62.

The piston 89 is sized and shaped to be enveloped by the flexible diaphragm member 84 as it collapses, as shown in FIG. 1. The piston 89 and the spring 90 are selected merely to aid the flexible diaphragm member 84 to roll and unroll, however, low pressure at either compensator port 60 or 62 may accomplish this without such aid. Those skilled in the art will appreciate that the flexible diaphragm member 84 could be replaced by other components having similar functionality, including a piston accumulator having a low gas charge, for example.

Operation

An important aspect of the invention is the way in which the differential volume of hydraulic fluid created by the piston rod retracting into the cylinder barrel is stored.

When the pump 14 is rotated in a direction to retract the piston rod 112, the second pump port 37 expels hydraulic fluid under pressure into the second supply conduit 36. The second supply conduit 36 distributes this hydraulic fluid into the first and second portions 42 and 44 thereof, which conduct hydraulic fluid to the second check valve 53 and to the second cross piloted check value 66 respectively. The second check value 53 opens, permitting fluid to flow from the second cylinder port 50 into the transfer tube 116, to retract the piston rod 110, while the second cross piloted check valve 66 is held closed by pressure in the second portion 44 of the second supply conduit 36. Closure of the second cross piloted check valve 66 prevents pressurized fluid from exiting the second compensator port 62 and entering the expandable chamber of the volume compensator 20.

When the piston rod 110 is fully retracted continued pressure from the pump 14 causes a pressure signal to communicate from the second portion 44 of the second supply conduit 36, by the third pilot conduit 68 to the first cross piloted check valve 64 causing it to open so that the difference between the volume of hydraulic fluid required to fill the rod end 104 of the cylinder 18 and the volume of hydraulic fluid expelling from the, blind end of the cylinder into the first cylinder port 48 can be communicated to the compensator 20. Hydraulic fluid flows through the first portion 38 of the first supply conduit 34 to the second portion 40 thereof to pass through the first cross piloted check value 64 to exit the first compensator port 60 into the expandable volume 86. The volumetric compensator 20, thus stores a volume of hydraulic fluid approximately equal to the volume occupied by the piston rod 110 in the cylinder 18, when the piston rod 112 is fully retracted.

Conversely, when the pump 14 rotates in a direction to extend the piston rod 110, hydraulic fluid from the first pump port 35 flows into the first pump port 30, and into the first and second portions 38 and 40 of the first supply conduit 34. Fluid in the first portion 38 is communicated to the first check valve 51, which opens to permit fluid to flow from the first cylinder port 48, into the blind end 102 of the cylinder 18. At the same, time fluid in the second portion 40 of the first supply conduit 34 is received at the first cross piloted check valve 64, closing it and preventing pressurized fluid from entering the expandable volume 86 of the volume compensator 20. A pressure signal from the second portion 40 of the first supply conduit 34 is communicated to the second cross piloted check valve 66 by the fourth pilot conduit 70, which opens the second cross piloted check valve 66 to permit hydraulic fluid to flow from the expandable volume into the second compensator port 62, through the second piloted check valve 66 and into the second portion 44 of the second supply conduit 36. This additional fluid from the volumetric compensator 20 is provided into the second supply conduit to compensate for the limited amount of fluid which can be supplied by the fluid expelling from the lesser volume of the rod end 104.

When thermal expansion takes place in the cylinder 18, an increase in hydraulic fluid pressure may be seen in either the rod end 104 or the blind end 102 of the cylinder 18, depending on which side is under pressure at the time. The increase in pressure will cause one of the thermal relief counterbalance valves 74 or 76 to open to relieve the increase in hydraulic fluid volume in the cylinder, by bleeding some hydraulic fluid into the first and/or second supply conduits 34 and/or 36 which conduct such hydraulic fluid to the first or second pilot operated check valves 64 and 66, which increases the pressure in one of the pilot conduits 68 or 70. The pilot conduit 68 or 70 that receives the greatest pressure, will open its corresponding pilot operated check valve 66 or 64 to permit hydraulic fluid to enter into the expandable volume 86 of the volumetric compensator 20. Thus, thermal expansion of hydraulic fluid in the system is compensated by the volumetric compensator 20 and has little or no effect on the function of the self-contained hydraulic actuator.

In the event that the pump 14 stops, fluid flow in the first and second supply conduits 34, 36 stops, causing the first and second check valves 51 and 53 to close, whereby fluid flow to and from the cylinder 18 is prevented, thereby locking the piston rod 112 in position.

During extension, retraction, or locking, if fluid pressure should become too great in either the first or the second conduit 34 or 36, then either the first or the second pressure relief valve 74 or 76 will open to reduce the pressure by transferring fluid to the other supply conduit 34 or 36.

The above described manifold is thus reservoir-less and enables the implementation of a free standing hydraulic linear actuator that provides for load locking without the operation of a prime mover, while providing the volumetric compensation of the difference in volume required on opposite sides of the hydraulic cylinder.

While a specific embodiment has been described, those skilled in the art will recognize many alterations that could be made within the spirit of the invention, which is defined solely according to the following claims.

What is claimed is:

1. A hydraulic system manifold comprising:

a) a body having first and second pump ports, first and second cylinder ports, first and second compensator ports and first and second supply conduits therein, the first and second supply conduits being in communication with said first and second pump ports;

b) a counterbalancer in the body and in communication with said first and second supply conduits and said cylinder ports, to communicate hydraulic fluid between said first and second supply conduits and said first and second cylinder ports while counterbalancing hydraulic fluid pressure in said first and second supply conduits, said counterbalancer comprising:

i) first and second cross piloted valves to permit fluid to flow from said first cylinder port to said first supply conduit and from said second cylinder port to said second supply conduit respectively; and ii) first and second check valves in communication with said first and second cross piloted valves to permit fluid to flow in directions opposite to that of said first and second cross piloted valves respectively; and c) a flow controller in the body and in communication with said first and second supply conduits and said compensator ports, to control the flow of hydraulic fluid between said compensator ports and said first and second supply conduits to supply and store hydraulic fluid in a volumetric compensator in communication with said first and second compensator ports, further comprising a volumetric compensator mount for removably mounting said volumetric compensator in communication with said first and second compensator ports.

2. The manifold of claim 1 wherein said first cross piloted valve is connected between said first supply conduit and said first cylinder port and said second cross piloted valve is connected between said second supply conduit and said second cylinder port such that a fraction of hydraulic pressure in said first supply conduit is operable to actuate said second cross piloted valve to permit fluid to flow from said second cylinder port to said second supply conduit and such that a fraction of hydraulic pressure in said second supply conduit actuates said first cross piloted valve to permit fluid to flow from said first cylinder port to said first supply conduit.

3. The manifold of claim 1 wherein said flow controller includes first and second cross piloted check valves, said first cross piloted check valve being in communication with said first supply conduit and said first compensator port and said second cross piloted check valve being in communication with said second supply conduit and said second compensator port and wherein said first cross piloted check valve is actuated by a fraction of hydraulic pressure in said second supply conduit to permit fluid to flow from said first supply conduit to said first compensator port and such that said second cross piloted check valve is actuated by a fraction of hydraulic pressure in said first supply conduit to permit fluid to flow from said second supply conduit to said second compensator port.

4. The manifold of claim 1 further comprising first and second pressure relief valves connected in opposite directions between said first and second supply conduits respectively.

5. The manifold of claim 1 further comprising a pump mount on said body for removably mounting a hydraulic fluid circulating pump to said body for communication with said first and second pump ports.

6. The manifold of claim 1 further comprising a cylinder mount for removably mounting a hydraulic cylinder in communication with said first and second cylinder ports.

7. The hydraulic system comprising the manifold of claim 1 and further comprising a hydraulic cylinder mounted to said body in communication with said first and second cylinder ports, a hydraulic circulating pump mounted to said body in communication with said first and second pump ports, and said volumetric compensator mounted to said body in communication with said first and second volumetric compensator ports.

8. A hydraulic system comprising the manifold of claim 1 and further comprising said volumetric compensator in communication with said first and second compensator ports, said volumetric compensator comprising:

a) a housing having an opening for communicating with said first and second compensator ports to receive and expel hydraulic fluid;

b) a flexible diaphragm member defining an expandable volume within said housing and in communication with said opening to receive hydraulic fluid therein; and c) a counterforce provider, for providing a counterforce on said flexible diaphragm member, tending to reduce said expandable volume.

9. The hydraulic system of claim 8 wherein said counterforce provider comprises a spring acting between said housing and said flexible diaphragm member.

10. A volumetric compensator for a hydraulic system, the volumetric compensator comprising:

a) a housing having an opening for receiving hydraulic fluid, b) a mount for removably mounting said housing to a hydraulic manifold such that said opening is in communication with first and second compensator ports of said manifold;

c) a flexible diaphragm member defining an expandable volume within said housing and in communication with said opening to receive hydraulic fluid therein; and d) a counterforce provider, for providing a counterforce on said flexible diaphragm member, tending to reduce said expandable volume.

11. The volumetric compensator of claim 10 wherein said counterforce provider comprises a spring acting between said housing and said flexible diaphragm member.

12. A hydraulic system comprising:

a) a body having first and second pump ports, first and second cylinder ports, first and second compensator ports and first and second supply conduits therein, the first and second supply conduits being in communication with said first and second pump ports;

b) a counterbalancer in the body and in communication with said first and second supply conduits and said cylinder ports, to communicate hydraulic fluid between said first and second supply conduits and said first and second cylinder ports while counterbalancing hydraulic fluid pressure in said first and second supply conduits;

c) a flow controller in the body and in communication with said first and second supply conduits and said compensator ports, to control the flow of hydraulic fluid between said compensator ports and said first and second supply conduits to supply and store hydraulic fluid in a volumetric compensator in communication with said first and second compensator ports; and d) said volumetric compensator in communication with said first and second compensator ports, said volumetric compensator comprising:

i) a housing having an opening for communicating with said first and second compensator ports to receive and expel hydraulic fluid;

ii) a flexible diaphragm member defining an expandable volume within said housing and in communication with said opening to receive hydraulic fluid therein; and iii) a counterforce provider, for providing a counterforce on said flexible diaphragm member, tending to reduce said expandable volume.

13. The hydraulic system of claim 12 wherein said counterforce provider comprises a spring acting between said housing and said flexible diaphragm member.

14. The system of claim 12 wherein said counterbalancer comprises first and second cross piloted valves, said first cross piloted valve being connected between said first supply conduit and said first cylinder port and said second cross piloted valve being connected between said second supply conduit and said second cylinder port such that a fraction of hydraulic pressure in said first supply conduit is operable to actuate said second cross piloted valve to permit fluid to flow from said second cylinder port to said second supply conduit and such that a fraction of hydraulic pressure in said second supply conduit actuates said first cross piloted valve to permit fluid to flow from said first cylinder port to said first supply conduit.

15. The system of claim 12 further comprising first and second pressure relief valves connected in opposite directions between said first and second supply conduits respectively.

16. The system of claim 12 further comprising a volumetric compensator mount for removably mounting said volumetric compensator in communication with said first and second compensator ports.

17. The system of claim 12 further comprising a hydraulic cylinder mounted to said body in communication with said first and second cylinder ports, a hydraulic circulating pump mounted to said body in communication with said first and second pump ports, and said volumetric compensator mounted to said body in communication with said first and second volumetric compensator ports.

* * * * *